Feb. 27, 1962 J. D. HARMS 3,022,861
FILTER MEDIUM
Filed Jan. 8, 1958
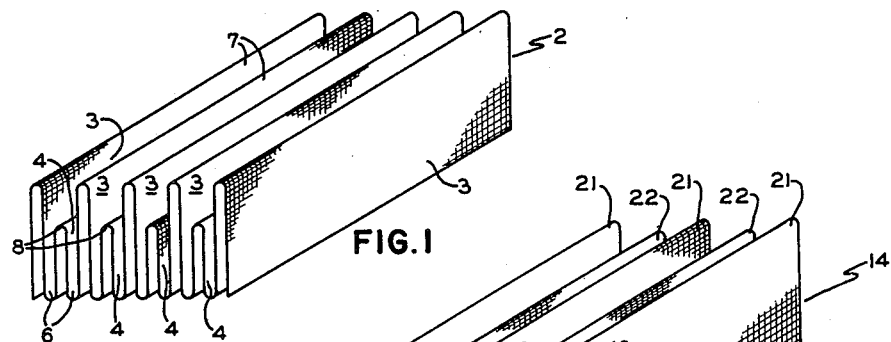
FIG. 1
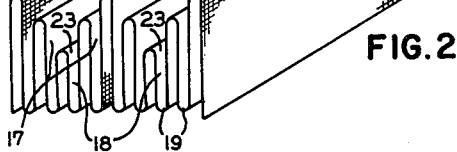
FIG. 2
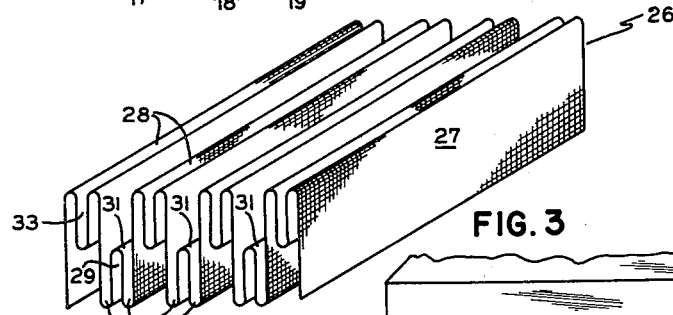
FIG. 3
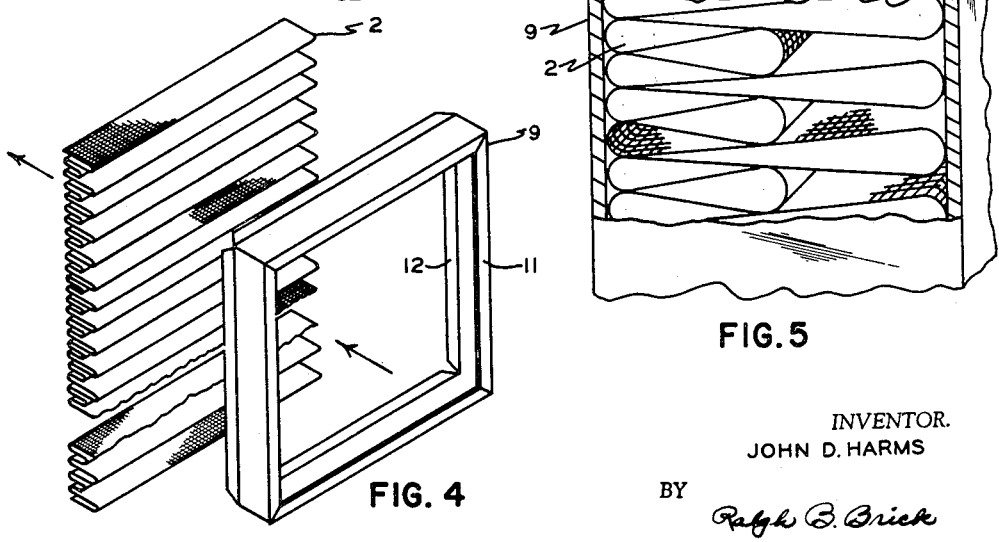
FIG. 4
FIG. 5
INVENTOR.
JOHN D. HARMS
BY Ralph B. Brick
ATTORNEY

United States Patent Office 3,022,861
Patented Feb. 27, 1962

3,022,861
FILTER MEDIUM
John D. Harms, Valley Station, Ky., assignor to American Air Filter Company, Inc., Louisville, Ky., a corporation of Delaware
Filed Jan. 8, 1958, Ser. No. 707,770
1 Claim. (Cl. 183—71)

This invention relates to a fluid filter and more particularly to an improved fluid filter medium construction for a fluid filter which is used to filter out suspended particles in a gaseous stream such as air.

In filtering suspended particles from a fluid stream, it has been found desirable to graduate the density of the filter medium that is used so that the less dense portion of the medium is toward the upstream side of the filter and the more dense portion is toward the downstream side. With such a graduated arrangement, the filtered particles tend to build up on the filter medium from the downstream side toward the upstream side, with the portion toward the upstream side of the medium having a greater dust holding capacity for the larger particles and the more dense portion toward the downstream side of the medium having a higher filtration efficiency on finer particles. It also has been found desirable in filtering suspended particles from a fluid stream to maintain the openings in the face of the upstream portion of the filter medium of sufficient size to avoid what is known in the art as "excessive face-loading" or more specifically, the buildup of suspended particles on the face of the medium to such an extent that the particles thereon prevent proper passage through the medium of the fluid stream to be filtered.

The present invention, recognizing these above mentioned desired features for a fluid filter, provides an improved filter medium arrangement which obtains all of such features in a straightforward, inexpensive, lightweight and compact construction that lends itself to a rapid and inexpensive manufacturing process.

Various other features of the present invention will become obvious to one skilled in the art upon reading the disclosure set forth hereinafter.

More particularly, the present invention provides a fluid filter medium which can be constructed from a single continuous sheet of material folded transversely back and forth upon itself in a plurality of long and short folds to form a plurality of crests and valleys with successive long folds being spaced by at least one of the short folds, thus maintaining the upstream crests of the long folds in spaced relationship to each other and increasing the downstream density of the formed filter medium.

It is to be understood that various changes can be made in the arrangement, form and construction of the apparatus disclosed herein without departing from the scope or spirit of this invention.

Referring to the drawings, which disclose several advantageous embodiments of the present invention:

FIGURE 1 is a perspective view of one arrangement of a filter medium constructed in accordance with the present invention prior to compression of the medium for insertion into a filter frame member;

FIGURES 2 and 3 are perspective views of filter mediums disclosing two further modifications of mediums, prior to compression, each medium being arranged in accordance with the present invention;

FIGURE 4 is a perspective view of a filter medium like that disclosed in FIGURE 1 in position to be assembled into a filter frame member but prior to compression of the medium for insertion into the member; and, FIGURE 5 is an enlarged perspective view of the filter medium of FIGURE 4, further disclosing details of the medium when in its compressed state within the filter frame member.

Referring to the drawings, the inventive filter mediums are each disclosed as being made from one continuous sheet of material to permit rapid and inexpensive construction. The sheet which is used to form the medium can be made from any one of a number of types of sturdy, porous, flexible materials which have been found satisfactory for filtering purposes, the selection of the particular material to be used for the medium being determined by the particular environment in which the medium is to be employed. Among the materials which have been found satisfactory in carrying out the present invention are lightweight metal screen mesh, expanded metal of the foil type and treated filter papers.

In the embodiment of FIGURE 1, a sheet of meshed wire screen material 2 is shown folded transversely back and forth upon itself to form a plurality of long folds 3 and short folds 4, the combined folds forming valleys 6 at what serves, during filtering operation, as the downstream face of the medium. At what serves as the upstream face of the medium during filtering operations, the long folds form crests 7. Set back from crests 7 toward the downstream side of the medium are crests 8 formed by the short folds 4 of the material. It is to be noted that in FIGURE 1 each of the successive long folds 3 is separated from its adjacent long fold by a single short fold 4. The depth of short folds 4 from crests 8 to valleys 6 is determined by the depth of the long folds from crests 7 to valleys 6 and the type of material which is employed. In most instances, it has been found advantageous that the depth of short folds 4 be approximately one-half or greater than the depth of long folds 3 to insure a more stable and stronger filter medium with successive upstream crests of the long folds being held in spaced relationship to avoid excessive face loading.

Referring to FIGURE 4 of the drawings, filter medium 2 of FIGURE 1 is disclosed as in position for assembly into a rectangular filter frame member 9, the arrows indicating the direction of fluid flow. Frame member 9 is provided with end face medium retaining borders 11 and 12 to retain the medium 2 in proper position within the frame member when the filter unit is finally assembled for use. It is to be noted that when the unit has been assembled (FIGURE 5) the density of the medium downstream of the unit is greater than upstream since, downstream of the medium, the medium includes the surface area of the short folds 4 as well as of the long folds 3. It also is to be noted that when medium 2 is ready for insertion into frame member 9, the medium is compressed along its sides and subsequently held in that position by the sides of the frame member so that the crest portions 8 of the short folds 4 abut against the sides of the long folds 3.

With such an arrangement as disclosed and with the spacing of crests 7 at the upstream face of the medium 2, it is possible to insure the desired "downstream to upstream" buildup of the filtered particles, with the less dense upstream side of the medium arranged to avoid excessive face loading and having a greater holding capacity for the large particles and the denser downstream side of the medium having a higher filtration efficiency on the finer particles.

In FIGURE 2, the principle of the present invention is disclosed as incorporated in a continuous sheet of material which is folded transversely back and forth upon itself to form a filter medium 14 having a plurality of long folds 16, intermediate folds 17 and short folds 18, the combined folds forming valleys 19 at what serves as the downstream face of the medium during filtering operations. At what serves as the upstream face of the medium during filtering operations, the long folds 16 form crests 21. Set back from crests 21 toward the downstream side of the medium are crests 22 formed by the intermediate folds 17 and set back from crests 22 are crests 23 which are formed by short folds 18. It is to be noted that each of the successive long folds 16 is separated by a pair of intermediate folds 17 and a short fold 18, the short fold 18 serving, in turn, to separate the pair of intermediate folds 17. With the arrangement of FIGURE 2, progressively increasing density graduation is obtained from the upstream side of the filter medium 14 toward the downstream side of the medium and at the same time problems of excessive face loading on the upstream side of the medium are also avoided, the additional shorter folds 17 and 18 between the long folds 16 assuring a proper spacing of crests 21 of the long folds. In this connection, it is also to be noted that the short folds 18 serve to assure a spacing of the crests 22 of intermediate folds 17 to avoid excessive particle loading intermediate the upstream and downstream faces of the medium.

Referring to FIGURE 3, the principle of the present invention wherein a sheet of material is folded transversely back and forth upon itself to form a plurality of long folds and a plurality of spacing short folds is disclosed in still a further modification. In the arrangement of filter medium 26 of FIGURE 3, a plurality of long folds 27 having crest portions 28 are disclosed as being spaced from each other by short folds 29 having crests 31, the long and short folds forming valleys 32 at what serves as the downstream face of the medium during filtering operations. For the most part, filter medium 26, as so far described, is substantially similar to filter medium 2 disclosed in FIGURE 1. However, it will be noted further that each of long folds 27 of medium 26 is further provided with a short fold 33 at the upstream crest portion thereof. This arrangement serves to further increase the surface area exposed to the fluid stream at the upstream side of the filter medium during filtering operations. Further, it is to be noted that if all of the short folds 29 and 33 are substantially equal in depth, as is disclosed in FIGURE 3, the medium is symmetrical about either face thereof and either face can serve as the upstream side of the medium.

Although only three embodiments of the present invention are disclosed in the drawings, it is to be understood that various other combinations can be made of long and short folds employing the principles of the present invention to form suitable filter mediums. It further is to be understood that all of such mediums can be arranged in their filter frame members in a compressed manner similar to that disclosed in FIGURE 4 or in various other ways depending on the results desired. For example, if so desired, the folds can be arranged in the frame to be at an angle to the direction of flow of the fluid stream rather than parallel thereto as disclosed in FIGURE 4.

The invention claimed is:

A unit filter assembly comprising an open-ended border frame member and a continuous sheet of filter medium in said frame member transversely disposed across the flow line of a gas flow stream to be treated, said sheet of filter medium being folded back and forth upon itself to form a first set of long folds having a plurality of crests and valleys and a second and third set of short folds, one of said sets of short folds being disposed at the crests of said long folds to increase the face surface thereof and the other of said sets of short folds being disposed in the valleys of said long folds to maintain said long folds in spaced relationship, the crests of each of said first, second and third sets of folds lying in a common plane with the plane determining the crests of one set of folds being parallel to the plane determining the crests of another set of folds, said second and third sets of short folds being of substantially the same depth to form a symmetrical filter medium with either face of said medium equally usable as an upstream face to a fluid stream destined to be filtered.

References Cited in the file of this patent
UNITED STATES PATENTS

| 1,883,715 | Greene | Oct. 18, 1932 |
| 2,627,350 | Wicks | Feb. 3, 1953 |

FOREIGN PATENTS

| 795,282 | France | Jan. 2, 1936 |
| 101,860 | Sweden | June 23, 1941 |
| 115,731 | Australia | Aug. 13, 1942 |
| 725,066 | Great Britain | of 1955 |